United States Patent
Kim et al.

(10) Patent No.: US 11,336,470 B2
(45) Date of Patent: May 17, 2022

(54) METHOD AND APPARATUS FOR TRANSMITTING AND RECEIVING WAKE-UP SIGNAL IN VEHICLE NETWORK

(71) Applicants: Hyundai Motor Company, Seoul (KR); Kia Motors Corporation, Seoul (KR)

(72) Inventors: Dong Ok Kim, Gyeonggi-do (KR); Seung Su Kim, Seoul (KR); Jin Hwa Yun, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 141 days.

(21) Appl. No.: 16/815,953

(22) Filed: Mar. 11, 2020

(65) Prior Publication Data
US 2020/0295957 A1    Sep. 17, 2020

(30) Foreign Application Priority Data
Mar. 15, 2019   (KR) .......................... 10-2019-0029775

(51) Int. Cl.
| | |
|---|---|
| *H04L 12/40* | (2006.01) |
| *H04L 12/12* | (2006.01) |
| *H04L 49/351* | (2022.01) |
| *H04L 67/12* | (2022.01) |
| *H04L 69/323* | (2022.01) |
| *H04L 41/0803* | (2022.01) |
| *H04L 67/145* | (2022.01) |

(52) U.S. Cl.
CPC ........ *H04L 12/12* (2013.01); *H04L 12/40039* (2013.01); *H04L 41/0803* (2013.01); *H04L 49/351* (2013.01); *H04L 67/12* (2013.01); *H04L 67/145* (2013.01); *H04L 69/323* (2013.01); *H04L 2012/40273* (2013.01)

(58) Field of Classification Search
None
See application file for complete search history.

(56) References Cited

U.S. PATENT DOCUMENTS

| | | | |
|---|---|---|---|
| 2019/0166423 A1* | 5/2019 | Anderson | H04B 17/309 |
| 2019/0230705 A1* | 7/2019 | Beruto | H04W 74/085 |
| 2019/0261420 A1* | 8/2019 | Pannell | H04L 1/0041 |
| 2019/0313446 A1* | 10/2019 | Kim | H04W 74/02 |
| 2019/0363991 A1* | 11/2019 | Sostawa | H04L 47/225 |
| 2021/0006432 A1* | 1/2021 | Krieger | H04L 12/6402 |

* cited by examiner

*Primary Examiner* — Ajit Patel
(74) *Attorney, Agent, or Firm* — Mintz Levin Cohn Ferris Glovsky and Popeo, P.C.; Peter F. Corless (57) ABSTRACT

An operation method of a first end node of an Ethernet-based vehicle network is provided. The operation method includes detecting a local event and transitioning an operation state of a physical layer (PHY) of the first end node from a sleep state to a wake-up state. A pseudo PHY identifier (ID) is configured as a PHY ID of the first end node in response to the first end node operating in the wake-up state. A first beacon including the pseudo PHY ID is then transmitted and the first beacon indicates that the first end node operates in the wake-up state.

16 Claims, 10 Drawing Sheets

METHOD AND APPARATUS FOR TRANSMITTING AND RECEIVING WAKE-UP SIGNAL IN VEHICLE NETWORK

CROSS-REFERENCE TO RELATED APPLICATION

This application claims the benefit of priority to Korean Patent Application No. 10-2019-0029775, filed on Mar. 15, 2019, the entirety of which is incorporated by reference as if fully set forth herein.

TECHNICAL FIELD OF THE DISCLOSURE

The present disclosure relates to communication technology in a vehicle network, and more specifically, to a technique for transmitting and receiving a wake-up signal between end nodes in a vehicle network including an Ethernet-based vehicle network.

BACKGROUND

The number and variety of devices installed within vehicles have increased significantly in accordance with the recent digitalization of vehicle parts. Generally, electronic devices may be used throughout the vehicles, for example, a power train control system (e.g., an engine control system, an automatic transmission control system, or the like), a body control system (e.g., a body electronic equipment control system, a convenience apparatus control system, a lamp control system, or the like), a chassis control system (e.g., a steering apparatus control system, a brake control system, a suspension control system, or the like), a vehicle network (e.g., a controller area network (CAN), a FlexRay-based network, a media oriented system transport (MOST)-based network, or the like), a multimedia system (e.g., a navigation apparatus system, a telematics system, an infotainment system, or the like), and so forth may be used.

The electronic devices used in each of the above-referenced systems are connected via a vehicle network, which supports functions of the electronic devices. For instance, the CAN may support a transmission rate of up to about 1 Mbps and support automatic retransmission of colliding messages, error detection based on a cycle redundancy interface (CRC), or the like. The FlexRay-based network may support a transmission rate of up to about 10 Mbps and support simultaneous transmission of data via two channels, synchronous data transmission, or the like. The MOST-based network is a communication network for high-quality multimedia, which may support a transmission rate of up to about 150 Mbps.

Many enhanced safety systems of a vehicle, such as telematics systems and infotainment systems, require higher transmission rates and system expandability. However, the CAN, FlexRay-based network, and the like may not sufficiently support such requirements. The MOST-based network, in particular, may support a higher transmission rate than the CAN or the FlexRay-based network. However, applying the MOST-based network to vehicle networks may be costly. Due to these limitations, an Ethernet-based network is often utilized as a vehicle network. The Ethernet-based network may support bi-directional communication via one pair of windings and may support a transmission rate of up to about 10 Gbps.

One of the Ethernet protocols that a vehicle network supports may be 10 Mbps single pair Ethernet (10SPE). For a 10SPE network to which a plurality of nodes are connected, a master node among the plurality of nodes transmits a wake-up signal. According to various scenarios to date, in response to an event such as an external event (e.g., door open, etc.), wake-up of any of the nodes of the network may occur. However, for 10SPE, in response to wake-up of any slave node, other nodes may not be able to wake-up. Thus, a modified protocol to improve a wake-up process is required. Additionally, in accordance with exemplary embodiments of the present disclosure, techniques for improving communication reliability between nodes in communication of the 10SPE-based network is required.

SUMMARY

The present disclosure provides a method and an apparatus for an end node connected to an Ethernet-based network to transmit a wake-up message to another end node regardless of a master-slave relation thereof. In accordance with an exemplary embodiment of the present disclosure, an operation method of a first end node of an Ethernet-based vehicle network may include detecting, by a controller of the first end node, a local event; transitioning, by the controller of the first end node, an operation state of a physical layer (PHY) of the first end node from a sleep state to a wake-up state; configuring, by the controller, a pseudo PHY identifier (ID) as a PHY ID of the first end node in response to the first end node operating in the wake-up state; and transmitting, by the controller, a first beacon including the pseudo PHY ID, wherein the first beacon indicates that the first end node operates in the wake-up state.

The pseudo PHY ID may be a PHY ID of a second end node operating as a master node in the vehicle network. The operation method may further include, after transmitting the first beacon, configuring the PHY ID of the first end node from the pseudo PHY ID to a unique PHY ID. A PHY preamble of the first beacon may include the pseudo PHY ID and a wake-up signal.

The operation method may further include receiving a second beacon from a second end node operating as a master node and in response to receiving the second beacon, initializing a transmission opportunity counter. The operation method may further include updating the transmission opportunity counter in response to a preconfigured time elapsing. In addition, the operation method may include, in response to determining that the updated transmission opportunity counter is equal to the unique PHY ID of the first end node, transmitting a first message including a reason for wake-up of the first end node.

In accordance with another exemplary embodiment of the present disclosure, an operation method of a first end node of an Ethernet-based vehicle network may include receiving a first beacon including a pseudo physical layer (PHY) identifier (ID) from a second end node; in response to receiving the first beacon, transitioning an operation state of the first end node from a sleep state to a wake-up state; and transmitting a second beacon including a unique PHY ID of the first end node. The first end node may operate as a master node in the vehicle network, and the second end node may operate as a slave node in the vehicle network. A PHY preamble of the first beacon may include the pseudo PHY ID and a wake-up signal.

In accordance with still another exemplary embodiment of the present disclosure, a first end node of an Ethernet-based vehicle network may include a physical layer (PHY) including a PHY processor; a controller having a processor; and a memory configured to store at least one instruction executable by each of the PHY and the controller. Additionally, the at least one instruction may be configured to instruct the controller to detect a local event; transition an operation state of a physical layer (PHY) of the first end node from a sleep state to a wake-up state; configure a pseudo PHY identifier (ID) as a PHY ID of the first end node in response to the first end node operating in the wake-up state; and transmit a first beacon including the pseudo PHY ID, wherein the first beacon indicates that the first end node operates in the wake-up state.

The pseudo PHY ID may be a PHY ID of a second end node operating as a master node in the vehicle network. After the first beacon is transmitted, the PHY ID of the first end node may be configured from the pseudo PHY ID to a unique PHY ID. A PHY preamble of the first beacon may include the pseudo PHY ID and a wake-up signal.

The PHY may be configured to receive a second beacon from a second end node operating as a master node and in response to receiving the second beacon, initialize a transmission opportunity counter. In addition, the PHY may be configured to update the transmission opportunity counter in response to a preconfigured time elapsing. In response to determining that the updated transmission opportunity counter is equal to the unique PHY ID of the first end node, the PHY may be configured to transmit a first message including a reason for wake-up of the first end node.

In accordance with still yet another exemplary embodiment of the present disclosure, a first end node of an Ethernet-based vehicle network may include a physical layer (PHY) including a PHY processor; a controller having a processor; and a memory configured to store at least one instruction executable by each of the PHY and the controller. Additionally, the at least one instruction may be configured to instruct the PHY to receive a first beacon including a pseudo physical layer (PHY) identifier (ID) from a second end node; in response to receiving the first beacon, transition an operation state of the first end node from a sleep state to a wake-up state; and transmit a second beacon including a unique PHY ID of the first end node. The first end node may operate as a master node in the vehicle network, and the second end node may operate as a slave node in the vehicle network. A PHY preamble of the first beacon may include the pseudo PHY ID and a wake-up signal.

According to the exemplary embodiments of the present disclosure, end nodes (e.g., electronic control units (ECUs)) belonging to an Ethernet-based network (e.g., 10 Mbps single pair Ethernet (10SPE) network) may wake-up regardless of master-slave relationship of the end nodes. A message may be generated based on a bus cycle, and the generated message may be transmitted.

An end node connected to the Ethernet-based (e.g., 10SPE) network may be configured to transmit a beacon message to other nodes, regardless of whether the node is a master node or a slave node, and wake-up other nodes. In response to wake-up of the nodes, data transfer between a master node and slave nodes may be performed with the master node based on a subsequent bus cycle. Therefore, communication reliability in communication between nodes may be improved, and the performance of the vehicle network may be improved.

BRIEF DESCRIPTION OF DRAWINGS

Exemplary embodiments of the present disclosure will become more apparent by describing in detail forms of the present disclosure with reference to the accompanying drawings, in which.

It should be understood that the above-referenced drawings are not necessarily to scale, presenting a somewhat simplified representation of various features illustrative of the basic principles of the disclosure. The specific design features of the present disclosure, including, for example, specific dimensions, orientations, locations, and shapes, will be determined in part by the particular intended application and use environment.

DETAILED DESCRIPTION

In particular, exemplary embodiments of the present disclosure will be described in detail with reference to the accompanying drawings. As those skilled in the art would realize, the described embodiments may be modified in various different manners, all without departing from the spirit or scope of the present disclosure. Further, throughout the specification, like reference numerals refer to like elements.

The terminology used herein is for the purpose of describing particular forms only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although forms are described herein as using a plurality of units to perform the exemplary process, it is understood that the exemplary processes may also be performed with one or plurality of modules. Additionally, it is understood that a controller/controller unit/control unit may perform one or more of the processes described further below, and the term controller/controller unit/control unit refers to a hardware device that includes a memory and a processor. The memory may be configured to store the modules, and the processor may be specifically configured to execute said modules to perform one or more processes which are described further below. Moreover, it is understood that the units or modules described herein may embody a controller/controller unit/control unit for controlling operation of the unit or module.

Furthermore, control logic of the present disclosure may be embodied as non-transitory computer readable media on a computer readable medium containing executable program instructions executed by a processor, controller/control unit or the like. Examples of the computer readable mediums include, but are not limited to, read-only memory (ROM), random access memory (RAM), compact disc (CD)-ROMs, magnetic tapes, floppy disks, flash drives, smart cards and optical data storage devices. The computer readable recording medium may also be distributed in network coupled computer systems. In other words, the computer readable media may be stored and executed in a distributed fashion, e.g., with a telematics server or a Controller Area Network (CAN).

Since the present disclosure may be variously modified and have several forms, specific embodiments will be shown in the accompanying drawings and be described in detail in the detailed description. It should be understood, however, that it is not intended to limit the present disclosure to the specific embodiments but, on the contrary, the present disclosure is to cover all modifications and alternatives falling within the spirit and scope of the present disclosure.

Relational terms such as first, second, and the like may be used for describing various elements, but the elements should not be limited by the terms. These terms are only used to distinguish one element from another. For example, a first component may be named a second component without departing from the scope of the present disclosure and the second component may also be similarly named the first component.

When it is mentioned that a certain component is "coupled with" or "connected with" another component, it should be understood that the certain component is directly "coupled with" or "connected with" to the other component or a further component may be disposed therebetween. In contrast, when it is mentioned that a certain component is "directly coupled with" or "directly connected with" another component, it will be understood that a further component is not disposed therebetween.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

The term "wake-up" and its variants may be used in the present disclosure to refer to a transition from one state to another, which may include a transition from a sleep state to a wake-up state, a transition from a low-power state to a full-power state, a transition from a powered-off state to a powered-on state, a transition from a non-functional or partially functional state to a fully functional state, intermediate states thereof, and the like.

Unless otherwise defined, all terms (including technical and scientific terms) used herein have the same meaning as commonly understood by one of ordinary skill in the art to which this disclosure belongs. Terms such as terms that are generally used and have been in dictionaries should be construed as having meanings matched with contextual meanings in the art. In this description, unless defined clearly, terms are not ideally, excessively construed as formal meanings.

In particular, forms of the present disclosure will be described in detail with reference to the accompanying drawings. In describing the disclosure, to facilitate the entire understanding of the disclosure, like numbers refer to like elements throughout the description of the figures and the repetitive description thereof will be omitted.

Figure 1:
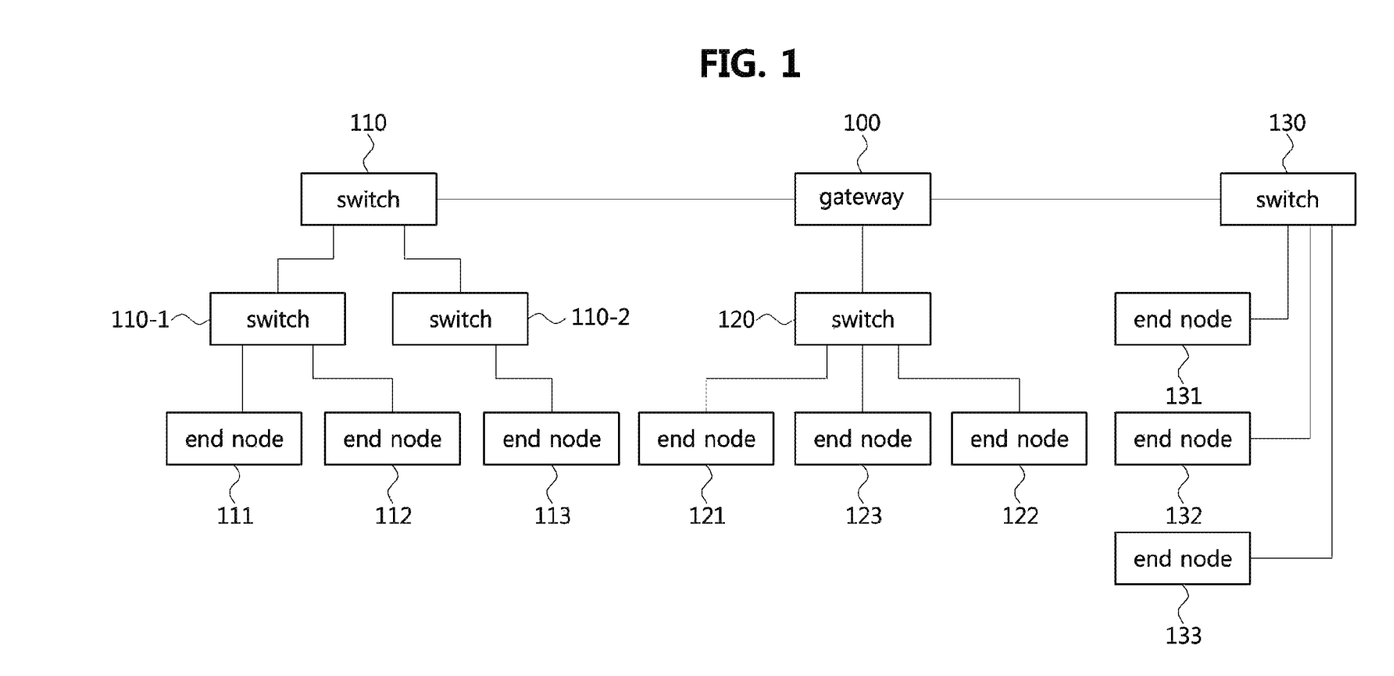
FIG. 1 is a block diagram illustrating a first exemplary embodiment of a vehicle network topology.

FIG. 1 is a block diagram illustrating a first exemplary embodiment of a vehicle network topology. As shown in FIG. 1, a communication node of a vehicle network may be a gateway, a switch (or bridge), or an end node. The gateway 100 may be connected with at least one switch 110, 110-1, 110-2, 120, and 130, and may be configured to connect different networks. For example, the gateway 100 may support connections with a switch, which supports a controller area network (CAN) (or, FlexRay, media oriented system transport (MOST), or local interconnect network (LIN)) network), and a switch, which supports an Ethernet protocol. Each of the switches 110, 110-1, 110-2, 120, and 130 may be connected to at least one of end nodes 111, 112, 113, 121, 122, 123, 131, 132, and 133. Each of the switches 110, 110-1, 110-2, 120, and 130 may interconnect the end nodes 111, 112, 113, 121, 122, 123, 131, 132, and 133, and each of the switches 110, 110-1, 110-2, 120, and 130 may operate at least one of the end nodes 111, 112, 113, 121, 122, 123, 131, 132, and 133 connected to the switch.

Each of the end nodes 111, 112, 113, 121, 122, 123, 131, 132, and 133 may include an electronic control unit (ECU), which may be configured to operate various types of devices mounted within a vehicle. For example, each of the end nodes 111, 112, 113, 121, 122, 123, 131, 132, and 133 may include an ECU included in an infotainment device (e.g., a display device, a navigation device, and an around view monitoring device).

The communication nodes (i.e., gateways, switches, end nodes, etc.) of the vehicle network may be connected in a star topology, a bus topology, a ring topology, a tree topology, a mesh topology, or the like. Further, each of the communication nodes of the vehicle network may support the CAN protocol, the FlexRay protocol, the MOST protocol, the LIN protocol, the Ethernet protocol, or the like. A communication node belonging to the vehicle network may be configured as follows.

Figure 2:
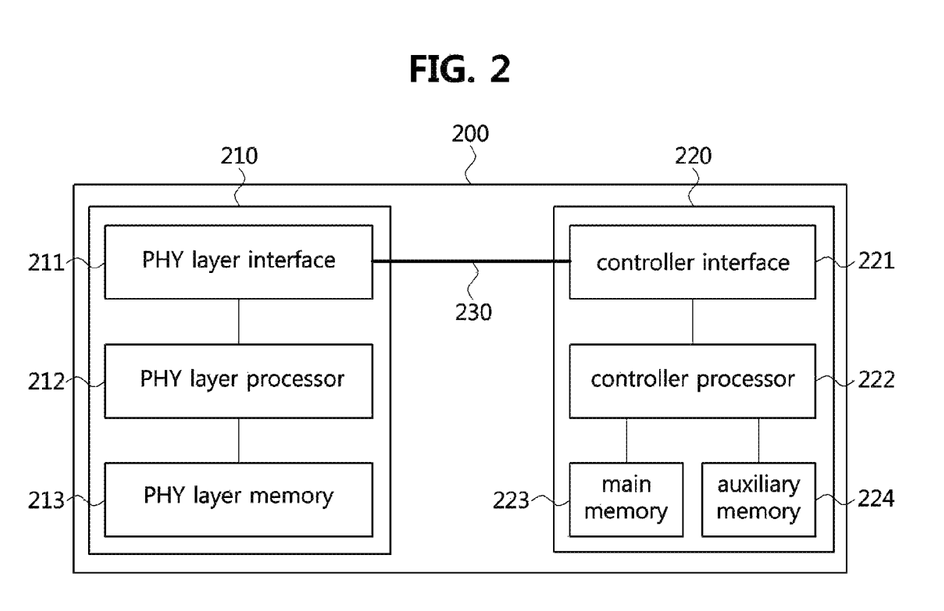
FIG. 2 is a block diagram illustrating a first exemplary embodiment of a communication node belonging to a vehicle network.

FIG. 2 is a block diagram illustrating a first exemplary embodiment of a communication node belonging to a vehicle network. As shown in FIG. 2, a communication node 200 of a vehicle network may include a physical (PHY) layer unit 210 and a controller 220. The communication node 200 may further include a regulator (not shown) for supplying power. In particular, the controller 220 may include a medium access control (MAC) layer. The PHY layer 210 may be configured to receive or transmit signals from or to another communication node. The controller 220 may be configured to operate the PHY layer 210 and perform various functions (e.g., an infotainment function, or the like). The PHY layer 210 and the controller 220 may be configured as one system on chip (SoC), or alternatively may be configured as separate chips.

The PHY layer 210 and the controller 220 may be connected via a media independent interface (MII) 230. The MII 230 may include an interface defined in the IEEE 802.3 and may include a data interface and a management interface with the PHY layer 210 and the controller 220. One of a reduced MII (RMII), a gigabit MII (GMII), a reduced GMII (RGMII), a serial GMII (SGMII), a 10 GMII (XGMII) may be used instead of the MII 230. The data interface may include a transmission channel and a reception channel, each of which may have an independent clock, data, and control signal. The management interface may include a two-signal interface, one signal for the clock and one signal for the data.

The PHY layer 210 may include a PHY layer interface 211, a PHY layer processor 212, and a PHY layer memory 213. The configuration of the PHY layer 210 is not limited thereto, and the PHY layer 210 may be configured in various manners. The PHY layer interface 211 may be configured to transmit a signal received from the controller 220 to the PHY layer processor 212 and transmit a signal received from the PHY layer processor 212 to the controller 220. The PHY layer processor 212 may be configured to perform operations of the PHY layer interface 211 and the PHY layer memory 213. The PHY layer processor 212 may be configured to modulate a signal to be transmitted or demodulate a received signal. The PHY layer processor 212 may be configured to operate the PHY layer memory 213 to input or output a signal. The PHY layer memory 213 may be configured to store the received signal and output the stored signal based on a request from the PHY layer processor 212.

The controller 220 may be configured to monitor and operate the PHY layer 210 using the MII 230. The controller 220 may be configured to include an interface 221, a processor 222, a main memory 223, and an auxiliary memory 224. The processor 222 may be configured as an electric circuit, which performs various functions described below. The configuration of the controller 220 is not limited thereto, and the controller 220 may be configured in various manners. The interface 221 may be configured to receive a signal from the PHY layer 210 (e.g., the PHY layer interface 211) or an upper layer (not shown), transmit the received signal to the processor 222, and transmit the signal received from the processor 222 to the PHY layer 210 or the upper layer. The processor 222 may further include independent memory control logic or integrated memory control logic for operating the interface 221, the main memory 223, and the auxiliary memory 224. The memory control logic may be configured to be included in the main memory 223 and the auxiliary memory 224, or the memory control logic may be configured to be included in the processor 222.

Each of the main memory 223 and the auxiliary memory 224 may be configured to store a signal processed with the processor 222 and may be configured to output the stored signal based on a request from the processor 222. The main memory 223 may be a volatile memory (e.g., RAM) configured to temporarily store data required for the operation of the processor 222. The auxiliary memory 224 may be a non-volatile memory in which an operating system code (e.g., a kernel and a device driver) and an application program code for performing a function of the controller 220 may be stored. A flash memory having a high processing speed, a hard disc drive (HDD), or a compact disc-read only memory (CD-ROM) for large capacity data storage may be used as the non-volatile memory. In some exemplary embodiments, the processor 222 may include a logic circuit having at least one processing core. A core of an Advanced RISC Machines (ARM) family or a core of an Atom family may be used as the processor 222.

Figure 3:
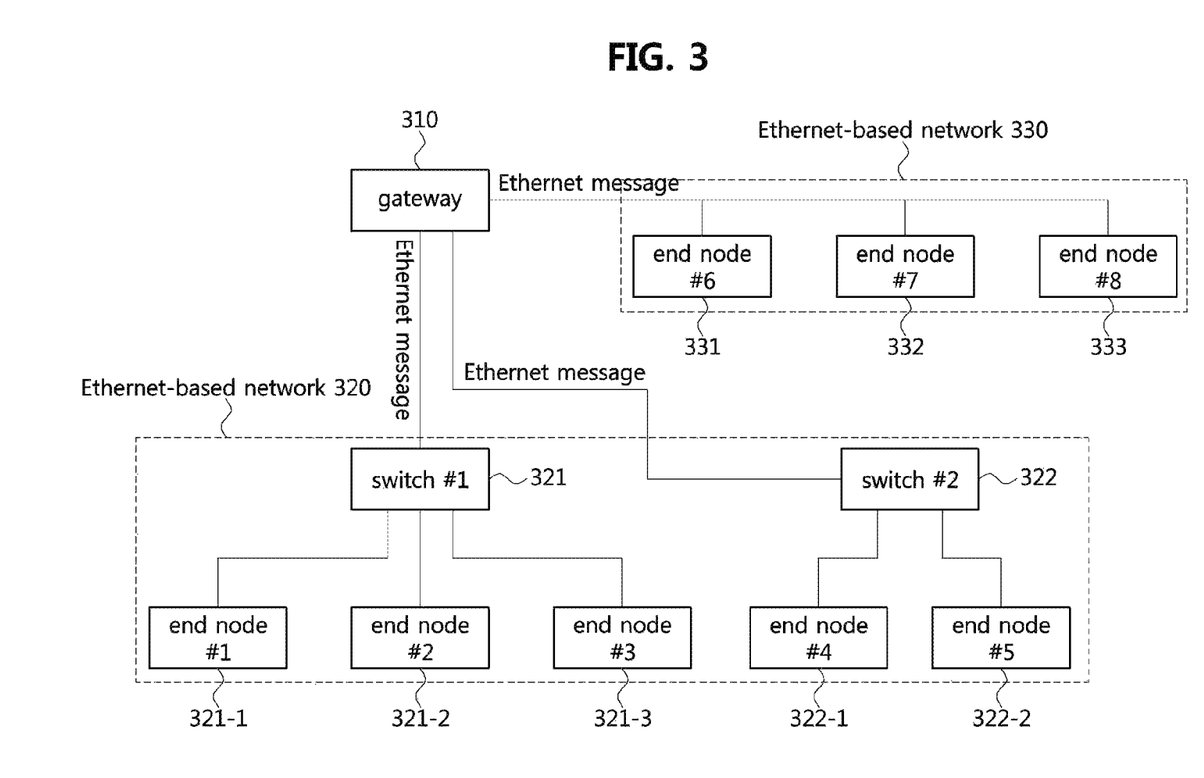
FIG. 3 is a block diagram showing a second exemplary embodiment of a vehicle network topology.
Figure 4:
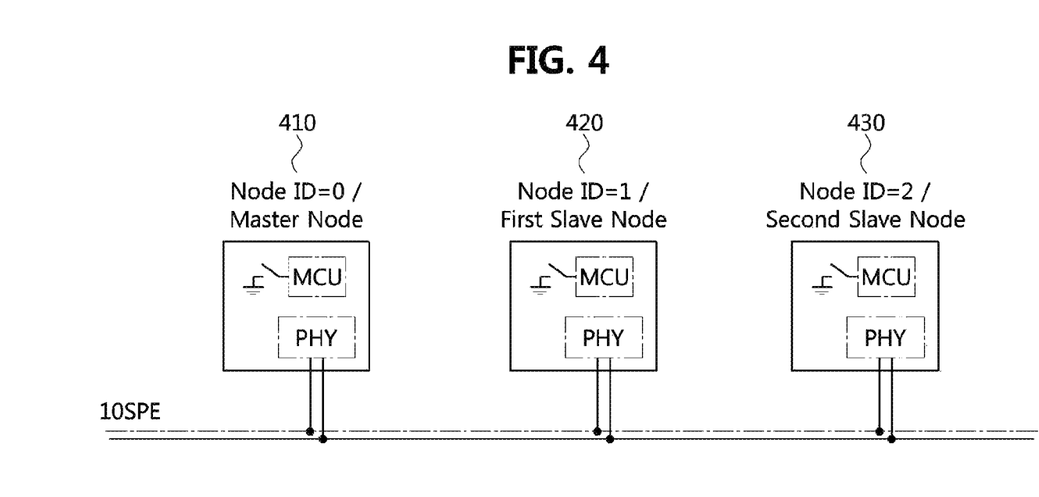
FIG. 4 is a block diagram illustrating an exemplary embodiment of a 10SPE network.

FIG. 3 is a block diagram showing a second exemplary embodiment of a vehicle network topology, and FIG. 4 is a block diagram illustrating an exemplary embodiment of a 10SPE network. As shown in FIG. 3, a vehicle network may include a plurality of Ethernet based networks 320 and 330. A gateway 310 belonging to the vehicle network may support Ethernet-based network communication. The Ethernet-based networks may include a switch #1 321, a switch #2 322, an end node #1 321-1, an end node #2 321-2, an end node #3 321-3, an end node #4 322-1, an end node #5 322-1, an end node #6 331, an end node #7 332, an end node #8 333, and the like. The end node #1 321-1, the end node #2 321-2, and the end node #3 323-1 may be connected to the switch #1 321, the end node #4 322-1 and the end node #5 322-2 may be connected to the switch #2 322, and the switch #1 321 and the switch #2 322 may be connected to the gateway 310.

One of the plurality of Ethernet based networks may be a 10 Mbps single pair Ethernet (10SPE) network 330. The end node #6 331, the end node #7 332, and the end node #8 333, which are connected with a 10SPE network scheme, may be connected to the gateway 310 via a bus or a single pair of wires.

Messages based on the Ethernet protocol may be referred to as "Ethernet messages", and the Ethernet messages may be referred to also as "Ethernet frames", "Ethernet signals", "Ethernet packets", or the like. The end nodes 321, 321-1, 321-2, 321-3, 322-1, 322-2, 331, 332, and 333, which are part of the Ethernet-based network, may communicate using Ethernet messages. Communication with the Ethernet-based networks and the gateway 310 may also be performed using Ethernet messages.

As shown in FIG. 4, the end nodes of the 10 SPE network may be configured with a master-slave relationship. For example, one end node 410 of the end nodes of the vehicle network may be a master node, and the remaining nodes 420 and 430 except the master node 410 may be slave nodes. The master node 410 and the slave nodes 420 and 430 may operate in a sleep state, and in response to receiving a local wake-up signal or a remote wake-up signal, an operation state of each of the master node 410 and the slave nodes 420 and 430 may transition from the sleep state to a wake-up state.

The master node 410 and the slave nodes 420 and 430 of the 10 SPE network may refer to electronic control units (ECUs) operating various devices included in the vehicle. Each of the end nodes of the vehicle network may support the Ethernet protocol.

The master node 410 and the slave nodes 420 and 430 may be connected in a bus topology. The master node 410 and the slave nodes 420 and 430 may be connected in a power over data lines (PoDL) scheme via a pair of wires. The pair of wires may be wires to supply power to the end node, or wires to transfer data packets between the end nodes.

The master node 410 among the end nodes of the 10 SPE network may be configured to supply a signal and power to wake-up the other slave nodes 420 and 430 via a pair of wires. Then, the master node 410 may be configured to communicate with the slave nodes 420 and 430 via a pair of wires. The slave nodes 420 and 430 may be configured to receive the signal from the master node 410 via a pair of wires, and transmit and receive data packets with other nodes via a pair of wires.

In response to an instruction to simultaneously transmit data packets from a plurality of end nodes connected to the 10SPE network to other end nodes, collisions between different data packets may occur in the PHY layer. A plurality of end nodes connected to the 10SPE network may use a PHY layer collision avoidance (PLCA) function to avoid collision in the PHY layer. In other words, the PLCA function may be a function of sequentially granting a transmission opportunity for transmitting a data packet to a plurality of end nodes connected to the 10SPE network. Additionally, each of the master node 410 and the slave nodes 420 and 430 may be operated using a micro-controller unit (MCU), which may be connected via a switch to ground.

Figure 5:
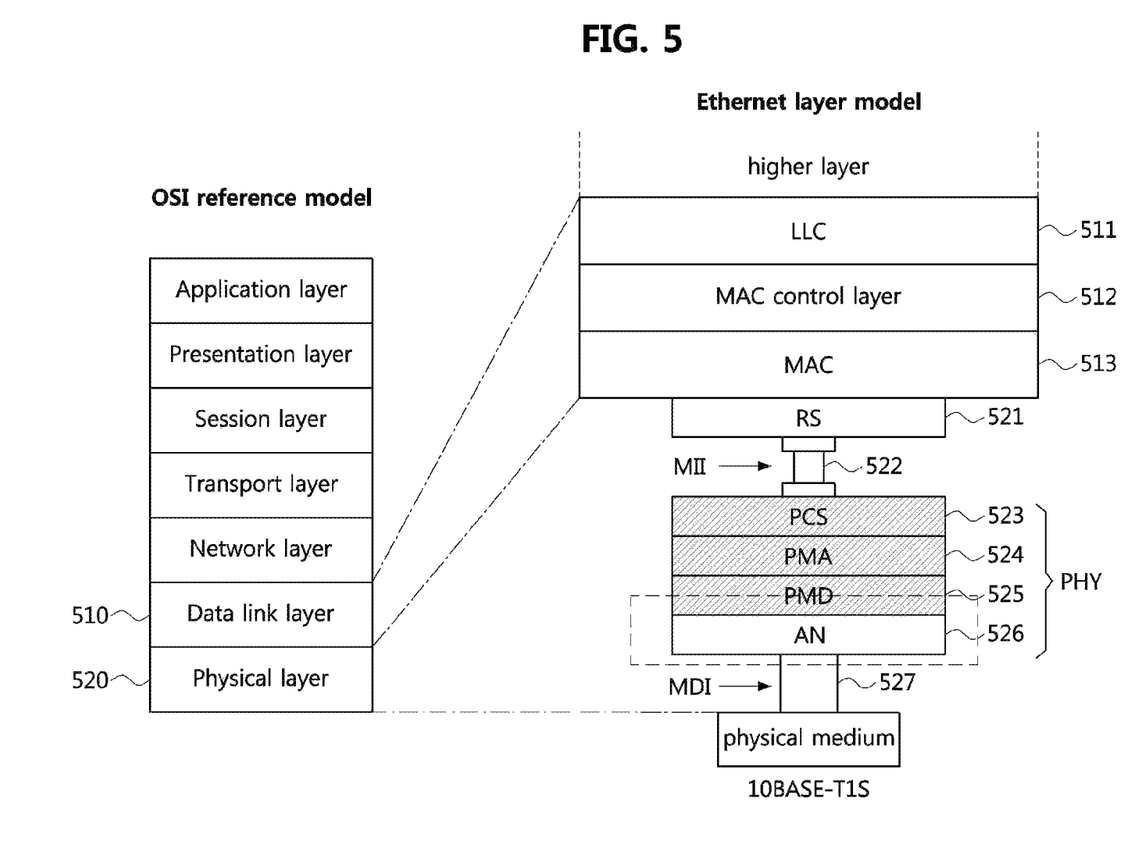
FIG. 5 is a conceptual diagram illustrating an Ethernet layer model according to an exemplary embodiment of the present disclosure.

FIG. 5 is a conceptual diagram illustrating an Ethernet layer model. As shown in FIG. 5, an Ethernet layer model may include a MAC layer and a PHY layer. The MAC layer of the Ethernet layer model may correspond to a data link layer 510 of the open systems interconnection (OSI) reference model, and may include a logical link control (LLC) or other MAC client sublayer 511, a MAC control sublayer 512, and a MAC sublayer 513.

The MAC layer of the Ethernet layer model may be connected to the PHY layer via a reconciliation sublayer (RS) 521 and an MII sublayer 522. The RS 521 and the MII sublayer 522 of the Ethernet layer model may correspond to a PHY layer 520 of the OSI reference model. The RS 521 may be configured to adjust logical signal mapping with the MAC sublayer 513 and a PCS 523 to be described later.

The RS 521 may be a sublayer supporting the PLCA function with the MAC layer and the PHY layer connected via the MII sublayer 522. The RS 521 may be configured to adjust mapping of signals of the MAC sublayer and the PCS 523 during a predetermined time slot to prevent collision in the PHY layer due to transmission of frames.

The PHY layer of the Ethernet layer model may correspond to a PHY layer 520 of the OSI reference model, and may include a physical coding sublayer (PCS) 523, a physical media attachment (PMA) sublayer 524, and a physical medium dependent (PMD) sublayer 525, and an auto-negotiation (AN) sublayer 526. The PCS 523 may be configured to obtain data from the MAC layer, and perform line coding on the data based on a protocol of the network (e.g., a transmission speed, etc.). The PCS 523 may be configured to transfer the data generated as a result of the line encoding to the PMA sublayer 524.

The PMA sublayer 524 may be configured to obtain the data generated as a result of the line encoding from the PCS 523, and convert the obtained data into a physical signal. The PMA sublayer 524 may be configured to transfer the data converted into the physical signal to the PMD sublayer 525. The PMD sublayer 525 may be configured to obtain the data converted into the physical signal from the PMA sublayer 524, and convert the obtained physical signal into a format suitable for a physical medium connected to the PHY layer.

The AN sublayer 526 may be a sublayer that configures an optimal transmission scheme of end nodes transmitting signals among a plurality of transmission schemes. The AN sublayer 526 may be configured to perform negotiation with other end nodes based on a plurality of signal transmission schemes to determine one signal transmission scheme. In addition, the AN sublayer 526 may be configured to determine a master-slave relationship of the plurality of end nodes. For example, in response to receiving a signal from another end node, the AN sublayer 526 may be configured to determine whether the end node transmitting the signal is a master node or a slave node.

The PHY layer of the Ethernet layer model may be connected to a physical medium via a medium dependent interface (MDI) 527. The MDI 527 may be configured to receive the physical signal from the PMD sublayer 525 and transmit the signal via the physical medium. The MDI 527 of the Ethernet layer model may correspond to the PHY layer 520 of the OSI reference model.

One or more steps of the methods described herein may be executed by a controller. In particular, a method performed at a communication node belonging to a vehicle network and a corresponding counterpart communication node will be described. Even when a method (e.g., transmission or reception of a signal) to be performed at a first communication node is described, a corresponding second communication node may perform a method (e.g., reception or transmission of the signal) that corresponds to the method performed at the first communication node. In other words, in response to performing an operation of the first communication node, the corresponding second communication node may be configured to perform an operation that corresponds to the operation of the first communication node. Conversely, in response to performing an operation of the second communication node, the corresponding first communication node may be configured to perform an operation that corresponds to the operation of the second communication node. Additionally, each of a plurality of end nodes may perform the following operations via at least one instruction stored in the memory.

Figure 6:
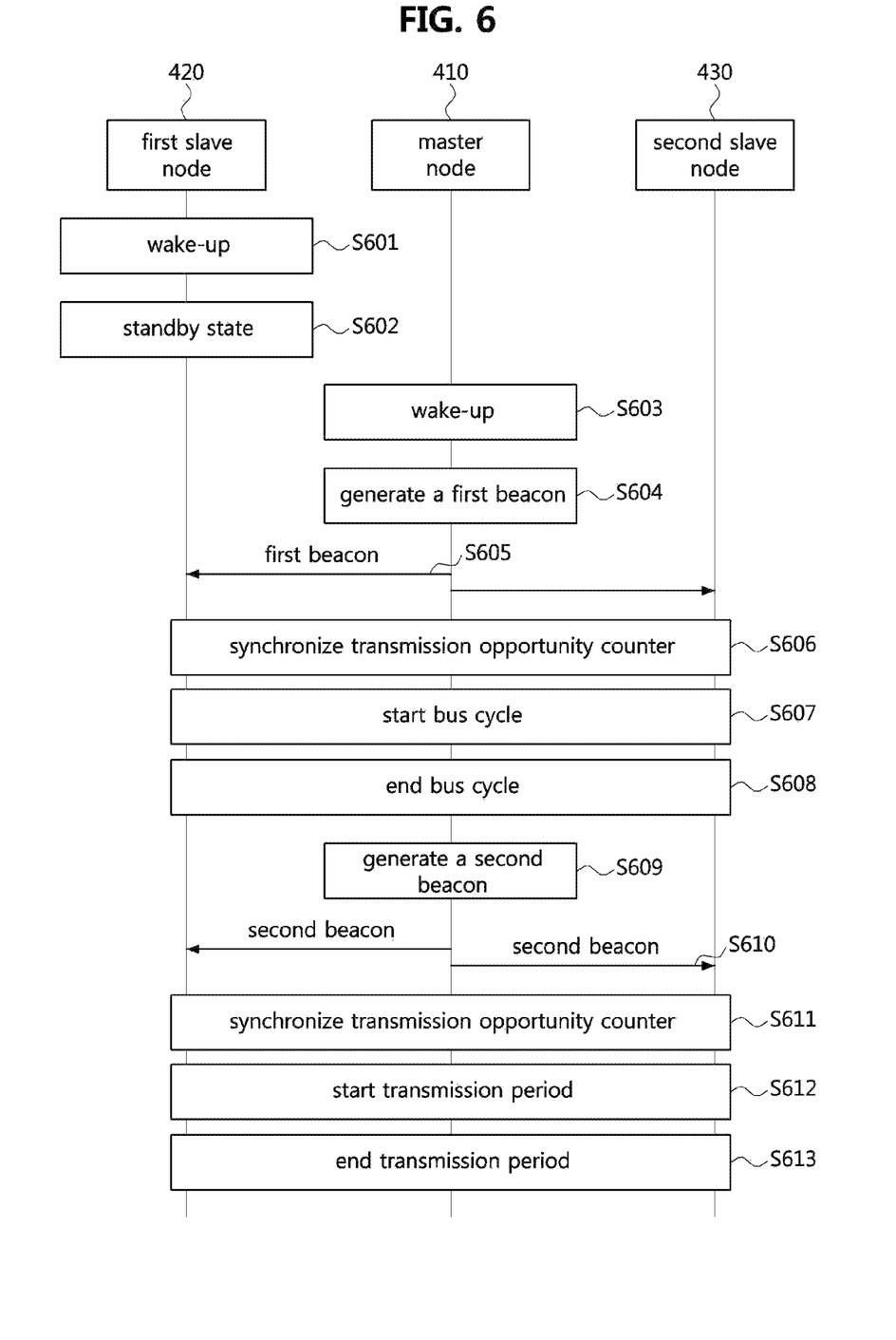
FIG. 6 is a sequence chart illustrating a first exemplary embodiment of an operation method of an end node belonging to a vehicle network.

FIG. 6 is a sequence chart illustrating a first exemplary embodiment of an operation method of an end node belonging to a vehicle network. As shown in FIG. 6, each of a plurality of end nodes 410, 420, and 430 may be connected to an Ethernet-based vehicle network. In the Ethernet-based vehicle network, each of the end nodes may be a master node or a slave node. Specifically, the end nodes may be classified into one master node and a plurality of slave nodes.

A PHY layer of each of the end nodes 410, 420, and 430 may have a PHY identifier (ID), which is a unique identifier. The PHY IDs of the end nodes 410, 420, and 430 may determine a master-slave relationship of the end nodes 410, 420, and 430. For example, an end node having a PHY ID of 0 may be determined as a master node (e.g., the end node 410), and an end node whose PHY ID is not 0 may be determined as a slave node (e.g., the end node 420 or 430).

A controller of an end node that detects an event from the outside among the plurality of end nodes may be configured to transition an operation state of the end node from a sleep state to a wake-up state. In response to the controller entering the wake-up state, the controller may be configured to wake-up a PHY layer connected with the controller. In response to the end node entering the wake-up state, the PHY layer of the end node (i.e., one of the master node 410 and the slave nodes 420 and 430) may be configured to determine and perform an operation based on the master-slave relationship of the end node (i.e., whether the end node is a master node or a slave node).

The end node 420 in the wake-up of step S601 may be a slave node whose PHY ID is not 0. To detect the local event, the controller may be configured to wake-up a PHY layer of the slave node 420. Then, the slave node 420 that does not receive a beacon from the master node 410 may maintain a standby state until receiving the beacon from the master node 410 (S602). In response to the slave node 420 not receiving the beacon, the slave node 420 may maintain the standby state until the master node 410 wakes up and transmits the beacon (S602).

The end node in the wake-up of step S603 may be a master node having a PHY ID of 0. The controller of the master node 410 that detected an event may be configured to wake-up a PHY layer of the master node 410. The wake-up of the PHY layer of the master node 410 may include transmitting a wake-up signal to the PHY layer of the master node 410. The PHY layer of the master node 410 may receive the wake-up signal and wake-up (S603).

The master node 410 in the wake-up of step S603 may be configured to start a beacon timer and generate a beacon (S604). The beacon generated immediately after the master node 410 wakes up in the S603 (S604) may be referred to as a first beacon. The master node 410 may be configured to transmit the first beacon generated in the S604 to the slave nodes 420 and 430 connected to the network (S605). The slave nodes 420 and 430 may be configured to receive the first beacon from the master node 410 (S605), and the slave node 420 receiving the first beacon from the master node 410 may be configured to synchronize a transmission opportunity counter included in the slave node 420 (S606).

Each of the PHY layers of the slave nodes 420 and 430 may be configured to identify a transmission opportunity counter of each of the PHY layers to determine whether a data packet transmission opportunity is granted to each of the PHY layers. The PHY layer of each of the slave nodes 420 and 430 may be configured to determine whether a transmission opportunity is granted to each of the slave nodes 420 and 430 based on the identified transmission opportunity counter.

In response to the slave nodes 420 and 430 receiving the first beacon from the master node 410 and synchronizing transmission opportunity counters of the slave nodes 410, 420 and 430, the transmission opportunity counters of the end nodes 410, 420 and 430 may be set to 0 (S606). After the transmission opportunity counters of the master node 410 and the slave nodes 420 and 430 are synchronized, the master node 410 may be configured to stop the beacon timer. In response to completing transmission and reception of a beacon of an end node (or the first beacon), a bus cycle (or, bus cycle) in which the end nodes 410, 420, and 430 connected to the network may be configured to transmit data packets may be started (S607).

Figure 7:
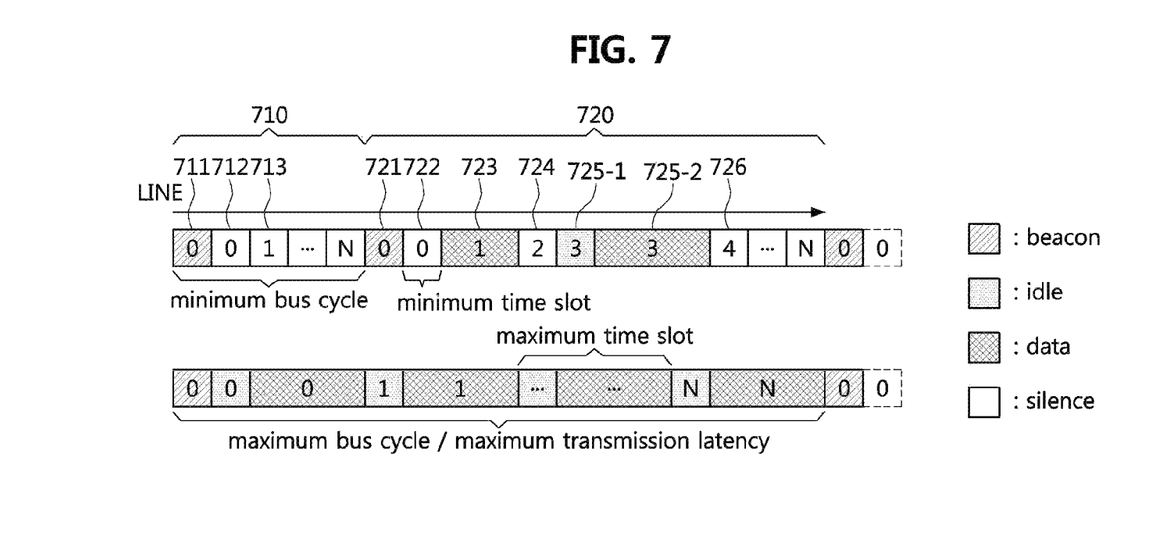
FIG. 7 is a conceptual diagram illustrating a bus cycle of an end node according to an exemplary embodiment of the present disclosure.

FIG. 7 is a conceptual diagram illustrating a bus cycle of an end node. As shown in FIG. 7, one bus cycle may include a plurality of time slots. The first time slot of the bus cycle may be a time slot (e.g., 712) after a time slot 711 in which the master node transmits a beacon. In response to connecting one master node 410 and N slave nodes 420 and 430 to the vehicle network, one bus cycle may include a time slot 712 in which the master node 410 may be configured to transmit data and N time slots starting from a time slot 713, in which N slave nodes 420 and 430 may be configured to transmit data, and thus may include a total of (N+1) time slots. In one time slot, a first end node may acquire a data packet transmission opportunity. The end node that acquired the data packet transmission opportunity may be configured to transmit a data packet to a second node in the corresponding time slot.

The durations of the remaining time slots except the time slot 711 in which the beacon is transmitted may vary based on an operation of the end node that acquired the transmission opportunity. For example, each of the time slots 712, 713, 722, and 724 in which there is no data transmission operation of the end node for a predetermined time from the starting time point of the time slot may be a silence slot. The time slot 725-1 in which the end node fails to perform a transmission operation due to a transmission latency after the starting time point of the time slot may be an idle slot. The time slots 723 and 725-2 in which the end node transmits data to other end nodes may be data slots, and the duration of the data slot may be proportional to the length of data transmitted with the end node. The duration of the bus cycle may vary based on the durations of time slots included in the bus cycle.

Figure 8:
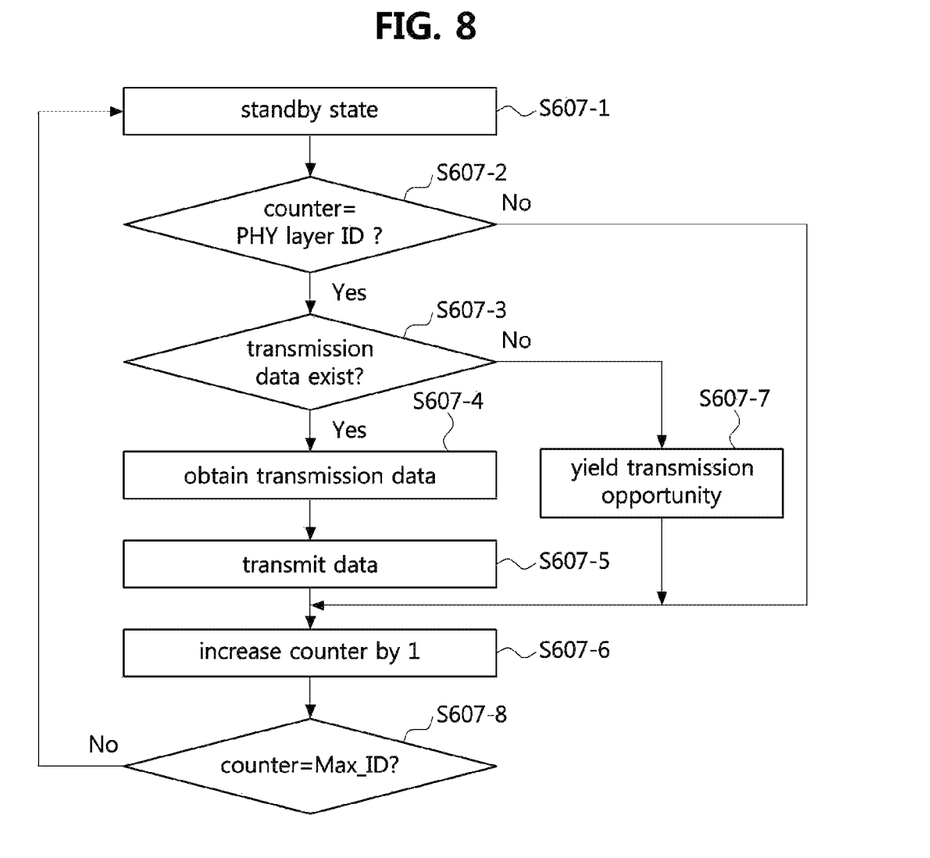
FIG. 8 is a sequence chart illustrating an exemplary embodiment of a transmission operation method of an end node during a bus cycle.

FIG. 8 is a sequence chart illustrating an exemplary embodiment of a transmission operation method of an end node during a bus cycle. As shown in FIG. 8, in response to a bus cycle starting, the end nodes 410, 420, and 430 may maintain a standby state (S607-1). In response to the PHY layer detecting a collision between two or more data packets, the master node 410 may be configured to terminate the bus cycle and generate a beacon again. The master node 410 may be configured to transmit the regenerated beacon, and the slave nodes 420 and 430 may be configured to receive the beacon from the master node 410. Upon receiving the beacon, the slave nodes 420 and 430 may be configured to re-synchronize their transmission opportunity counters.

The end nodes 410, 420, and 430 may be configured to determine whether a transmission opportunity is granted based on the transmission opportunity counter (S607-2). The PHY layer of the end node may be configured to compare the transmission opportunity counter with the PHY ID of the end node (S607-2). The transmission opportunity counter may be equal to the index of the time slot of the bus cycle.

End nodes that do not have a PHY ID, which is the same as the number indicated with the transmission opportunity counter, may not acquire a data transmission opportunity, and the PHY layers of the corresponding end nodes may maintain the standby state for a preconfigured time. After the preconfigured time elapses, the PHY layers of the end nodes that do not acquire the transmission opportunity may increase their transmission opportunity counters by 1 (S607-6).

The PHY layer of the end node having the same PHY ID as the number indicated with the transmission opportunity counter may acquire an opportunity to transmit data. The end node given the data transmission opportunity may be configured to determine whether a data packet to be transmitted to other end nodes exists (S607-3). The controller of the end node may be configured to determine whether there is a data packet to be transmitted to other end nodes (S607-3). The controller of the end node may be configured to transfer a data packet to be transmitted to other end nodes to the PHY layer (S607-4).

The PHY layer of the end node that acquired the transmission opportunity may be configured to transmit the data packet obtained from the controller of the end node to other end nodes connected to the vehicle network (S607-5). The PHY layer of the end node that completed the data packet transmission may be configured to terminate the transmission opportunity. In response to completing the data transmission operation, the PHY layers of the end nodes may increase their transmission opportunity counters by 1 (S607-6).

The PHY layer of the end node acquiring the transmission opportunity but having no data packet to be transmitted to the other end nodes (e.g., the PHY layer that did not acquire data packet from the controller) may yield the data transmission opportunity to other end nodes (S607-7). In response to a preconfigured time elapsing, the PHY layer of the end node performing the operation of yielding the transmission opportunity may be configured to terminate the data packet transmission procedure. The termination of the data packet transmission procedure may include terminating the transmission opportunity. In response to the data packet transmission procedure ending, the PHY layers of the end nodes connected to the network may increase transmission opportunity counters of the PHY layers by one (S607-6).

An initial value of the transmission opportunity counter may be set to 0, and the maximum value of the transmission opportunity counter may be one less than the number of nodes provided in the communication network, which may be referred to as Max_ID. Accordingly, in response to connecting one master node 410 and N slave nodes 420 and 430 to the network, data transmission opportunities may be given to sequentially from the master node 410 having a PHY layer ID of 0 to the slave node having a PHY layer ID of N. Additionally, the end node that acquires the data transmission opportunity may be configured to transmit data to other nodes. The end nodes connected to the network may repeat the data transmission operation or the standby operation until the transmission opportunity counter becomes Max_ID.

The master node may be configured to compare the preconfigured Max_ID with the transmission opportunity counter of the node (S607-8). In response to a determination that the transmission opportunity counter not equal to Max_ID, the PHY layer of the end node having the same PHY ID as the incremented transmission opportunity counter may acquire the data transmission opportunity. In response to the transmission opportunity counter equaling Max_ID, the first bus cycle may end (S608).

Referring back to FIG. 6, after the first bus cycle ends, the master node 410 may be configured to generate a beacon (S610). The beacon generated after the end of the first bus cycle may be referred to as a second beacon. The master node 410 may be configured to transmit the second beacon generated in the step S610 to the other slave nodes 420 and 430 connected to the network (S611).

The PHY layers of the slave nodes 420 and 430 may be configured to receive the second beacon from the master node 410 (S610). The slave nodes 420 and 430 may be configured to synchronize their transmission opportunity counters based on the received second beacon (S611). As a result of the synchronization operation, the PHY layers of the master node 410 and the slave nodes 420 and 430 connected to the network may be configured to set transmission opportunity counters to 0 to synchronize the transmission opportunity counters (S611).

In response to a beacon timer of the master node 410 expiring, and in response to transmitting and receiving a beacon of the end node (or, the second beacon), a new bus cycle may start (S612). Even after the bus cycle started in the step S612 ending in the step S613, the master node 410 and the slave nodes 420 and 430 connected to the network may repeat bus cycles.

Figure 9:
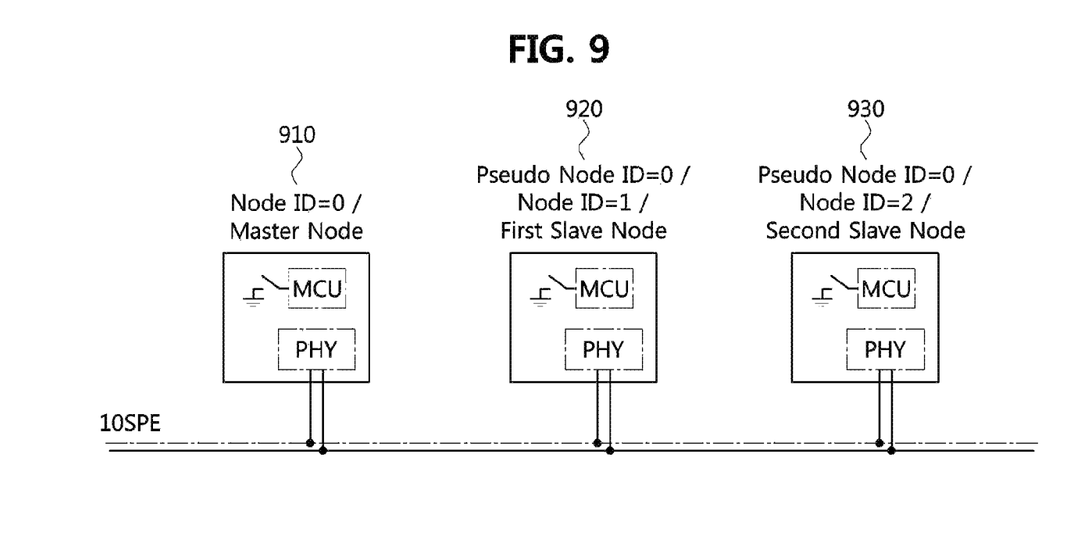
FIG. 9 is a block diagram illustrating a second exemplary embodiment of a 10SPE network.

FIG. 9 is a block diagram illustrating a second exemplary embodiment of a 10SPE network. As shown in FIG. 9, a PHY layer of each of a plurality of end nodes 910, 920, and 930 may configure a PHY identifier (ID) of the end nodes 910, 920, and 930. For example, the preconfigured PHY IDs of the plurality of end nodes 920 and 930 may be unique PHY IDs of the end nodes 920 and 930. Additionally, in response to satisfying a preconfigured condition, the end node 920 or 930 may generate a pseudo PHY ID, which is an ID separate from a unique PHY of the end node 920 or 930. The pseudo PHY ID may be the same as a PHY ID of the master node 910 of the communication network. For example, the slave node 920 or 930 connected to the communication network may temporarily change a PHY ID of the slave node 920 or 930 from the unique PHY ID to the pseudo PHY ID in response to satisfying the preconfigured condition.

Figure 10:
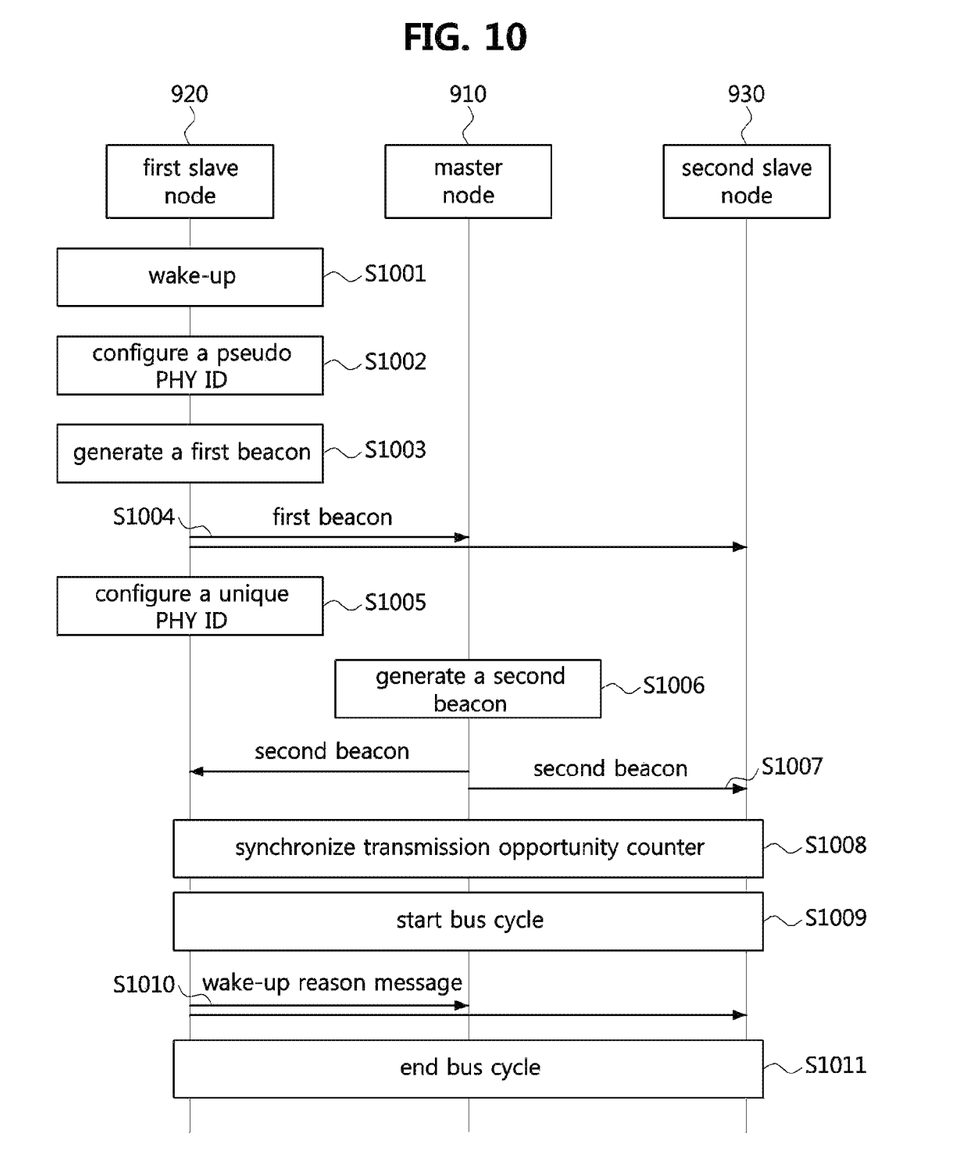
FIG. 10 is a sequence chart illustrating a second exemplary embodiment of an operation method of an end node belonging to a vehicle network.

FIG. 10 is a sequence chart illustrating a second exemplary embodiment of an operation method of an end node belonging to a vehicle network. As shown in FIG. 10, a controller of the end node 920 that detects an external event among the plurality of end nodes may be configured to transition an operation state to the wake-up state (S1001). The controller may be configured to wake-up a PHY layer in the end node 920 (S1001). In particular, the end node 920 may be a slave node. Additionally, among the end nodes connected to the vehicle network, in response to the slave node (e.g., 920) entering the wake-up state earlier than the master node 910, the slave node (e.g., 920) may be referred to as a first slave node.

The PHY layer of the first slave node 920 may have a unique PHY ID. The PHY layer of the first slave node 920 may be configured to generate a pseudo PHY ID different from the unique PHY ID. The pseudo PHY ID generated with the first slave node 920 may be a PHY ID of the end node 910 operating as a master node in the vehicle network. The PHY layer of the first slave node 920 may configure the pseudo PHY ID as a PHY ID of the first slave node 920 (S1002).

Again referring to FIG. 10, the first slave node 920 operating in the wake-up state may generate a beacon (S1003). The beacon generated with the first slave node 920 may be defined as a first beacon. The first beacon may include a MAC layer message and a PHY layer message. In particular, a PHY preamble of the first beacon may include a wake-up signal instructing transition of operation states of end nodes receiving the first beacon from the sleep state to the wake-up state. The wake-up signal may be represented as an AN status register.

The first slave node 920 may be configured to transmit the generated first beacon to other end nodes including the master node 910 and the second slave node 930 (S1004). Then, other end nodes including the master node 910 may be configured to receive the first beacon from the first slave node 920 (S1004). The PHY layers included in other end nodes, including the master node 910, may wake-up by receiving the first beacon.

The first slave node 920, which transmitted the beacon, may reconfigure a PHY ID of the first slave node 920 (S1005). For example, after generating and transmitting the first beacon based on the pseudo PHY ID, the first slave node 920 may change the PHY ID of the first slave node 920 from the pseudo PHY ID to the unique PHY ID after transmitting the beacon (S1005).

The PHY layer of the master node 910 that received the first beacon may generate a beacon (S1006). The beacon generated by the PHY layer of the master node 910 may be defined as a second beacon. The second beacon may include the unique PHY ID of the master node 910. The PHY layer of the master node 910 may transmit the generated second beacon to the PHY layers of other slave nodes 920 and 930 connected to the communication network (S1007). The slave nodes 920 and 930 may receive the second beacon from the master node 910 (S1007). The PHY layers of the slave nodes 920 and 930 that received the second beacon may synchronize their transmission opportunity timers (S1008).

After the second beacon transmission and reception procedures of the master node 910 and the slave nodes 920 and 930 are completed, a bus cycle may proceed (S1009). In response to the bus cycle starting, a transmission opportunity counter of each of the slave nodes 920 and 930 may be started. Each of the slave nodes 920 and 930 may compare a transmission opportunity counter and a unique PHY ID. A slave node having the unique PHY ID identical to a number indicated by the transmission opportunity counter may acquire an opportunity to transmit data. On the other hand, end nodes that do not have the unique PHY ID identical to the number indicated by the transmission opportunity counter may remain in a standby state.

The PHY layer of the first slave node 920 may remain in the standby state until the transmission opportunity counter becomes equal to the unique PHY ID of the first slave node 920. The first slave node 920 granted the transmission opportunity may transmit a wake-up reason message to the PHY layers of the end nodes connected to the network (S1010).

The wake-up reason message may be a message indicating a reason for the wake-up of the first slave node 920. The wake-up reason message generated by the first slave node 920 may be transmitted to the end nodes 910 and 930 connected to the network (S1010). The PHY layer of each of the end nodes 910 and 930 may be configured to receive the wake-up reason message. Among the end nodes in the wake-up state, an end node performing an operation related to the wake-up reason may remain in the wake-up state. The end node maintaining the wake-up state may perform an operation indicated by the wake-up reason message. On the other hand, end nodes not performing an operation related to the wake-up reason may transition back to the sleep state.

After the bus cycle is terminated (S1011), the master node 910 may be configured to generate and transmit a beacon. The slave nodes 920 and 930 may be configured to receive the beacon from the master node 910, and the master node 910 and the slave nodes 920 and 930 connected to the network may repeat bus cycles.

The methods according to exemplary embodiments of the present disclosure may be implemented as program instructions executable by a variety of computers and recorded on a non-transitory computer readable medium. The non-transitory computer readable medium may include a program instruction, a data file, a data structure, or a combination thereof. The program instructions recorded on the computer readable medium may be designed and configured specifically for the present disclosure or may be publicly known and available to those who are skilled in the field of computer software. Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device may be configured to operate as at least one software module to perform the operation of the present disclosure, and vice versa.

The foregoing description has been directed to exemplary embodiments of the present disclosure. It will be apparent, however, that other variations and modifications may be made to the described exemplary embodiments, with the attainment of some or all of their advantages. Accordingly, this description is to be taken only by way of example and not to otherwise limit the scope of the exemplary embodiments herein. Therefore, it is the object of the appended claims to cover all such variations and modifications as come within the true spirit and scope of the exemplary embodiments herein.

What is claimed is:

1. An operation method of a first end node of an Ethernet-based vehicle network, comprising:
   detecting, by a controller of the first end node, a local event;
   transitioning, by the controller of the first end node detecting the local event, an operation state of a physical layer (PHY) of the first end node from a sleep state to a wake-up state;
   configuring, by the controller, a pseudo PHY identifier (ID) as a PHY ID of the first end node in response to the first end node operating in the wake-up state; and
   transmitting, by the controller, a first beacon including the pseudo PHY ID and a wake-up signal,
   wherein the first beacon indicates that the first end node operates in the wake-up state.

2. The operation method according to claim 1, wherein the pseudo PHY ID is a PHY ID of a second end node operating as a master node in the vehicle network.

3. The operation method according to claim 1, further comprising:
   after transmitting the first beacon, configuring, by the controller, the PHY ID of the first end node from the pseudo PHY ID to a unique PHY ID.

4. The operation method according to claim 3, further comprising:
   receiving by a second beacon from a second end node operating as a master node; and
   in response to receiving the second beacon, initializing by a transmission opportunity counter.

5. The operation method according to claim 4, further comprising updating the transmission opportunity counter in response to a preconfigured time elapsing.

6. The operation method according to claim 5, further comprising:
   in response to determining that the updated transmission opportunity counter is equal to the unique PHY ID of the first end node, transmitting, by the controller, a first message including a reason for wake-up of the first end node.

7. An operation method of a first end node of an Ethernet-based vehicle network, comprising:
   receiving, by a controller, a first beacon including a pseudo physical layer (PHY) identifier (ID) and a wake-up signal from a second end node;
   in response to receiving the first beacon, transitioning, by the controller, an operation state of the first end node from a sleep state to a wake-up state when the first beacon includes the wake-up signal; and
   in response to operating the first end node in the wake-up state, transmitting, by the controller, a second beacon including a unique PHY ID of the first end node,
   wherein the pseudo PHY ID is the unique PHY ID of the first end node.

8. The operation method according to claim 7, wherein the first end node operates as a master node in the vehicle network, and the second end node operates as a slave node in the vehicle network.

9. A first end node of an Ethernet-based vehicle network, the first end node comprising:
   a physical layer (PHY) including a PHY processor;
   a controller having a processor; and
   a memory configured to store at least one instruction executable by each of the PHY and the controller, wherein the at least one instruction is configured to cause the controller to:
  detect a local event;
  transition an operation state of a physical layer (PHY) of the first end node detecting the local event from a sleep state to a wake-up state;
  configure a pseudo PHY identifier (ID) as a PHY ID of the first end node in response to the first end node operating in the wake-up state; and
  transmit a first beacon including the pseudo PHY ID and a wake-up signal,
  wherein the first beacon indicates that the first end node operates in the wake-up state.

10. The first end node according to claim 9, wherein the pseudo PHY ID is a PHY ID of a second end node operating as a master node in the vehicle network.

11. The first end node according to claim 9, wherein after the first beacon is transmitted, the PHY ID of the first end node is configured from the pseudo PHY ID to a unique PHY ID.

12. The first end node according to claim 11, wherein the at least one instruction is further configured to cause the controller to:
  receive a second beacon from a second end node operating as a master node; and
  in response to receiving the second beacon, initialize a transmission opportunity counter.

13. The first end node according to claim 12, wherein the at least one instruction is further configured to cause the controller to update the transmission opportunity counter in response to a preconfigured time elapsing.

14. The first end node according to claim 13, wherein the at least one instruction is further configured to, in response to determining that the updated transmission opportunity counter is equal to the unique PHY ID of the first end node, cause the PHY to transmit a first message including a reason for wake-up of the first end node.

15. A first end node of an Ethernet-based vehicle network, comprising:
  a physical layer (PHY) including a PHY processor;
  a controller having a processor; and
  a memory configured to store at least one instruction executable by each of the PHY and the controller,
  wherein the at least one instruction is configured to cause the controller to:
  receive a first beacon including a pseudo physical layer (PHY) identifier (ID) and a wake-up signal from a second end node;
  in response to receiving the first beacon, transition an operation state of the first end node from a sleep state to a wake-up state when the first beacon includes the wake-up signal; and
  in response to operating the first end node in the wake-up state, transmit a second beacon including a unique PHY ID of the first end node,
  wherein the pseudo PHY ID is the unique PHY ID of the first end node.

16. The first end node according to claim 15, wherein the first end node operates as a master node in the vehicle network, and the second end node operates as a slave node in the vehicle network.

* * * * *